(12) United States Patent
Kremerman (10) Patent No.: US 10,946,303 B2
(45) Date of Patent: *Mar. 16, 2021

(54) SHORT DISTILLATION HEAD WITH BULBOUS LOWER COLLECTOR

(71) Applicant: Elliot Kremerman, Los Gatos, CA (US)

(72) Inventor: Elliot Kremerman, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/580,393

(22) Filed: Sep. 24, 2019

(65) Prior Publication Data

US 2021/0001244 A1 Jan. 7, 2021

Related U.S. Application Data (63) Continuation of application No. 16/458,446, filed on Jul. 1, 2019, now Pat. No. 10,456,703.

(51) Int. Cl.
   *B01D 3/14* (2006.01)
   *B01D 3/32* (2006.01)
   *B01D 5/00* (2006.01)

(52) U.S. Cl.
   CPC ............ *B01D 3/14* (2013.01); *B01D 3/32* (2013.01); *B01D 5/006* (2013.01); *B01D 5/009* (2013.01); *B01D 5/0063* (2013.01)

(58) Field of Classification Search
   CPC . B01D 3/14; B01D 3/32; B01D 5/006; B01D 5/0063; B01D 5/009
   See application file for complete search history.

(56) References Cited

U.S. PATENT DOCUMENTS

2018/0161693 A1* 6/2018 Kremerman ........... B01D 5/006

* cited by examiner

*Primary Examiner* — Renee Robinson
(74) *Attorney, Agent, or Firm* — Michael J. Feigin, Esq.; Feigin and Fridman LLC (57) ABSTRACT

The distillation apparatus of the disclosed technology has a bulbous bottom side which extends below a plane defined by an outer cover which circumscribes a rest of a lower collector region which has there-within the bulbous or spheriod end. Further within the outer cover and/or functionally connected to the lower collector region is a vertical tube passing both into an area circumscribed by the lower collector region as well as passing into an area circumscribed by a fraction collector situated there-above. The fraction collector can have a same width (horizontal directional extent) as the lower collector region at a widest portion thereof. A rejection area can be created beneath the spheroid bottom end of the lower collector region as well at an interior top side of the lower collector region outside of the vertical tube.

19 Claims, 6 Drawing Sheets

SHORT DISTILLATION HEAD WITH BULBOUS LOWER COLLECTOR

FIELD OF THE DISCLOSED TECHNOLOGY

The disclosed technology relates generally to distillation and, more specifically, to a short path distillation head.

BACKGROUND OF THE DISCLOSED TECHNOLOGY

Distillation or fractional distillation is carried out by heating a solid or liquid and removing gaseous vapors that are expelled therefrom. This can be done while raising the temperature, as each compound boils at a different temperature. However, when working with small amounts of starting raw material or items which have close boiling points, this can be difficult, as multiple compounds get removed simultaneously. Further, a problem can arise when the temperature throughout the distillation equipment is not constant, and some of the vapor re-condenses before being evacuated from a distillation chamber.

Thus, there is a need to find a way to distill with greater efficiency and separation of compounds, while preventing vapors from re-condensing back into the product being distilled.

SUMMARY OF THE DISCLOSED TECHNOLOGY

A distillation apparatus of embodiments of the disclosed technology has a lower collector region with a spheroid lower end and a tube extending into an interior space of the lower collector region and an interior space of a fraction collector. The lower collector region is can have a rounded top and/or bottom side. The lower collector region can also have a top flat side. A vertical tube, such as one with a circular cross section throughout, can functionally connect the lower collector region to the fraction collector. A "collector" for purposes of this disclosure is a device which is closed except for portals of entry or exit for gases or liquids, each portal being within a single side of a respective collector. The collectors further circumscribe a definite and recognizable, to an ordinary observer, interior space there-in a housing.

The lower collector can have a plurality of portals therein the sides, a top portal which opens to the vertical tube, and a bottom portal which can be smaller than any of the side portals. The fraction collector can have a side portal such as one which is aligned with a bottom edge of the fraction collector, as well as a bottom portal which opens into the vertical tube or through which the vertical tube passes-therein, into a space circumscribed by the fraction collector.

Figure 3:
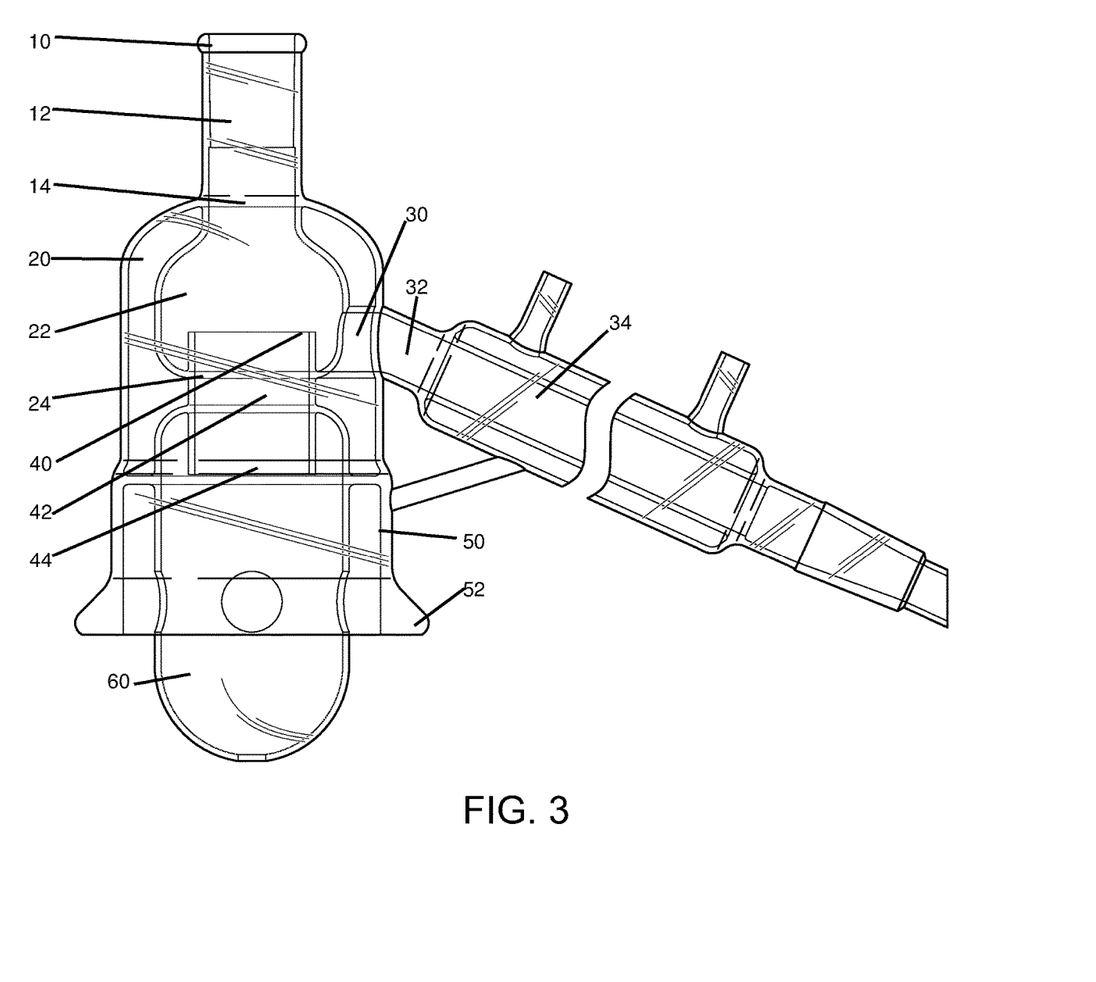
FIG. 3 shows a side elevation view of the distillation apparatus of FIG. 1.

The directional descriptors used in this disclosure, such as "top", "bottom", "vertical", and "horizontal" are relative to a typical direction of use with a heat source below the opening into the vertical tube and/or directional the orientation of the device as shown in FIG. 3 on the page.

The lower collector region can have a top side which form a rejection area surrounded by the flat upper side, a part of a vertically extending side wall, and the vertical tube. A rejection area is defined as an area where upward extending vapors are blocked from further upward passage, forcing the vapors to condense (at least partially) or causing turbulent flow with at least some of the vapors falling back downwards before finding a different upwards path of travel.

The (vertical) tube can have smooth side walls and terminate at each top and bottom side at a horizontal portal, the top portal opening within the fraction collector and the bottom portal opening within the lower collector region. On either side of the tube, the fraction collector or lower collector region surrounds same, each of which can have a same widest circumference. Around each of these items is an outer cover, in embodiments, which directly surrounds (without interposition by any other device except air or vacuum) the fraction collector, tube, and lower collection area at least in part or a majority thereof. However, in embodiments of the disclosed technology, the outer cover surrounds some or most of the lower collector while some or a minority of the lower collector (40%, 20%, 10% or substantially thereabout) is unencumbered by the outer cover. This allows the unencumbered portion of the lower collector to be inside of a flask where a solid being distilled (e.g. directly about a heat source) is situated. "Unencumbered" is defined as "at a horizontal cross section, having no other portion of the distillation apparatus surrounding or to the outside of."

The lower collector region, in embodiments of the disclosed technology, has a plurality of side entry portals. This can include one, two four, or more two portals which open at an upwards angle and likewise at a downwards angle, in one or two rows. A bottom portal, at the bottom side of the lower collector region (e.g. facing or opening into a boiling flask situated below the distillation apparatus) can also be used and can have a smaller circumference or diameter than some or all other portals of the lower collector region.

A portal extends through the outer cover and functionally connects the fraction collector to a condenser in embodiments of the disclosed technology. "Functionally connecting" is defined as "having a continuous passageway for vapors or liquids to pass through."

Described a slightly different way, the distillation apparatus has an outer cover surrounding an equal width fraction collector and at least part of a lower collector region. A condenser is functionally connected to the fraction collector by way of a portal which passes through the outer cover. The lower collector region has a rounded lower side unsurrounded (unencumbered) by the outer cover. The lower collector region can have solid sides and a solid bottom, but for circular portals of entry. One of the circular portals of entry is at a top side and opens into a tube functionally connected between the fraction collector and the lower collector region in some embodiments of the disclosed technology. Additional circular portals of entry are cut into sides of the lower collector region surrounded by the outer cover in some embodiments. A bottom circular portal of the circular portals is at a bottom apex of a rounded lower collector region in some embodiments. The tube extends into a space defined by (the walls of) the fraction collector and into a space defined by (the walls of) the lower collector region. The distillation apparatus can be entirely made of glass or inert metal or some combination thereof.

A "distillation key" is an elongated inert structure, such as a glass structure and which can be solid, which has a most elongated extent which passes through and is spaced apart from the vertical tube. The undulations of the vertical tube and distillation key help "reject" particles being distilled, meaning that particles which are cooler or heavier than average during heated distillation can be caught on the outwardly extending portions of the undulations or other areas of the distillation equipment which hinder a direct flow of matter in an otherwise upwards direction, causing same to condense and fall downwards.

"Smooth" is defined as "extending laterally in a most elongated direction" and "without noticeable undulation". Thus, the vertical tube, at a smooth portion thereof, extends directly in a top/bottom direction.

A "distillation head" or "distillation apparatus" is defined as a device in which vapors of a solid, liquid, or combination solid and liquid product to be distilled move upwards therein before exiting into a distribution adapter or condenser. "Distillate" refers to and is defined as the vapor, liquid, or combination thereof which exits, by way of the fraction collector, from the distillation head and is ultimately fractionally distilled into component parts, each component part having different physical properties such as a different boiling point.

Any device or step to a method described in this disclosure can comprise, or consist of, that which it is a part of, or the parts which make up the device or step. The term "and/or" is inclusive of the items which it joins linguistically and each item by itself. Any element or described portion of the devices shown can be "substantially" as such, if used in the claims in this manner. Where used, "substantially" is defined as "within a 5% tolerance level thereof."

DETAILED DESCRIPTION OF EMBODIMENTS OF THE DISCLOSED TECHNOLOGY

The distillation apparatus of the disclosed technology has a bulbous bottom side which extends below a plane defined by an outer cover which circumscribes a rest of a lower collector region which has there-within the bulbous or spheriod end. Further within the outer cover and/or functionally connected to the lower collector region is a vertical tube passing both into an area circumscribed by the lower collector region as well as passing into an area circumscribed by a fraction collector situated there-above. The fraction collector can have a same width (horizontal directional extent) as the lower collector region at a widest portion thereof. A rejection area can be created beneath the spheroid bottom end of the lower collector region as well at an interior top side of the lower collector region outside of the vertical tube.

Embodiments of the disclosed technology will become more clear in view of the following discussion of the figures.

Figure 1:
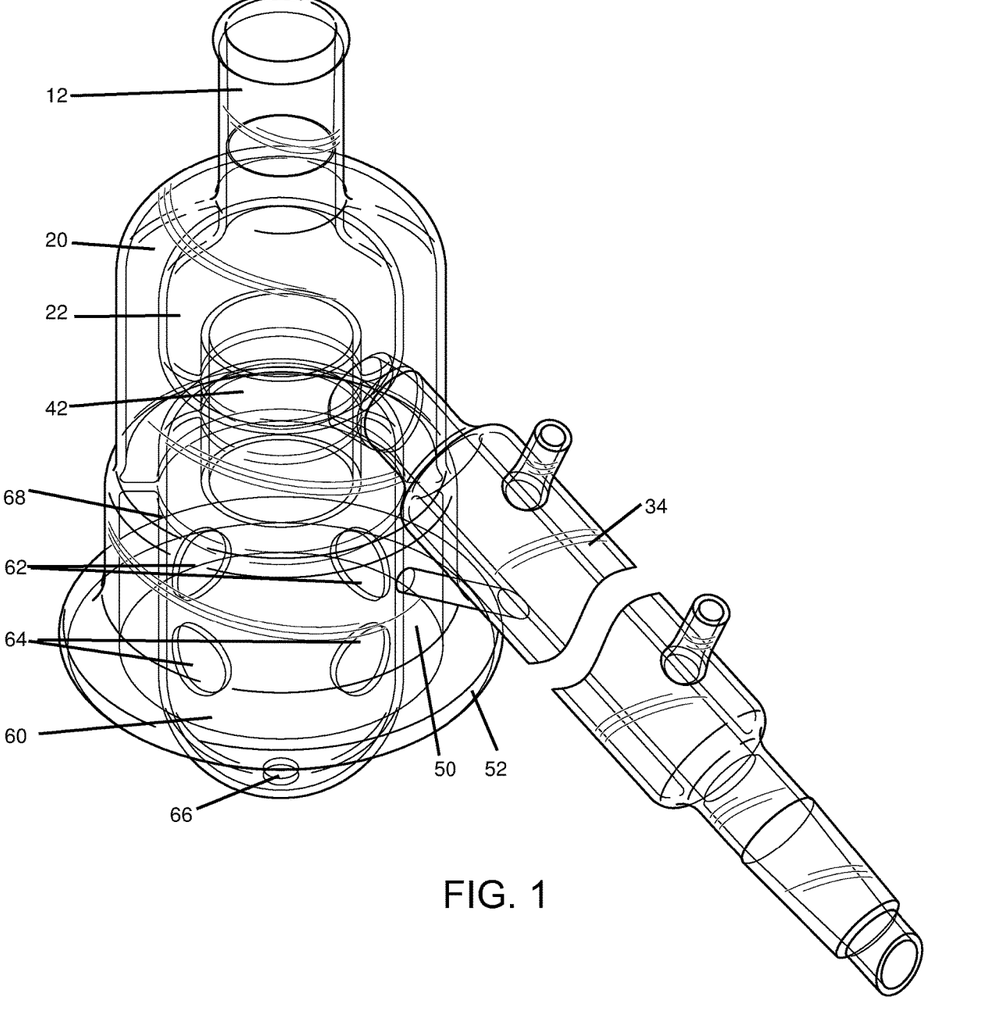
FIG. 1 shows a top and side perspective view of a distillation apparatus of an embodiment of the disclosed technology.
Figure 2:
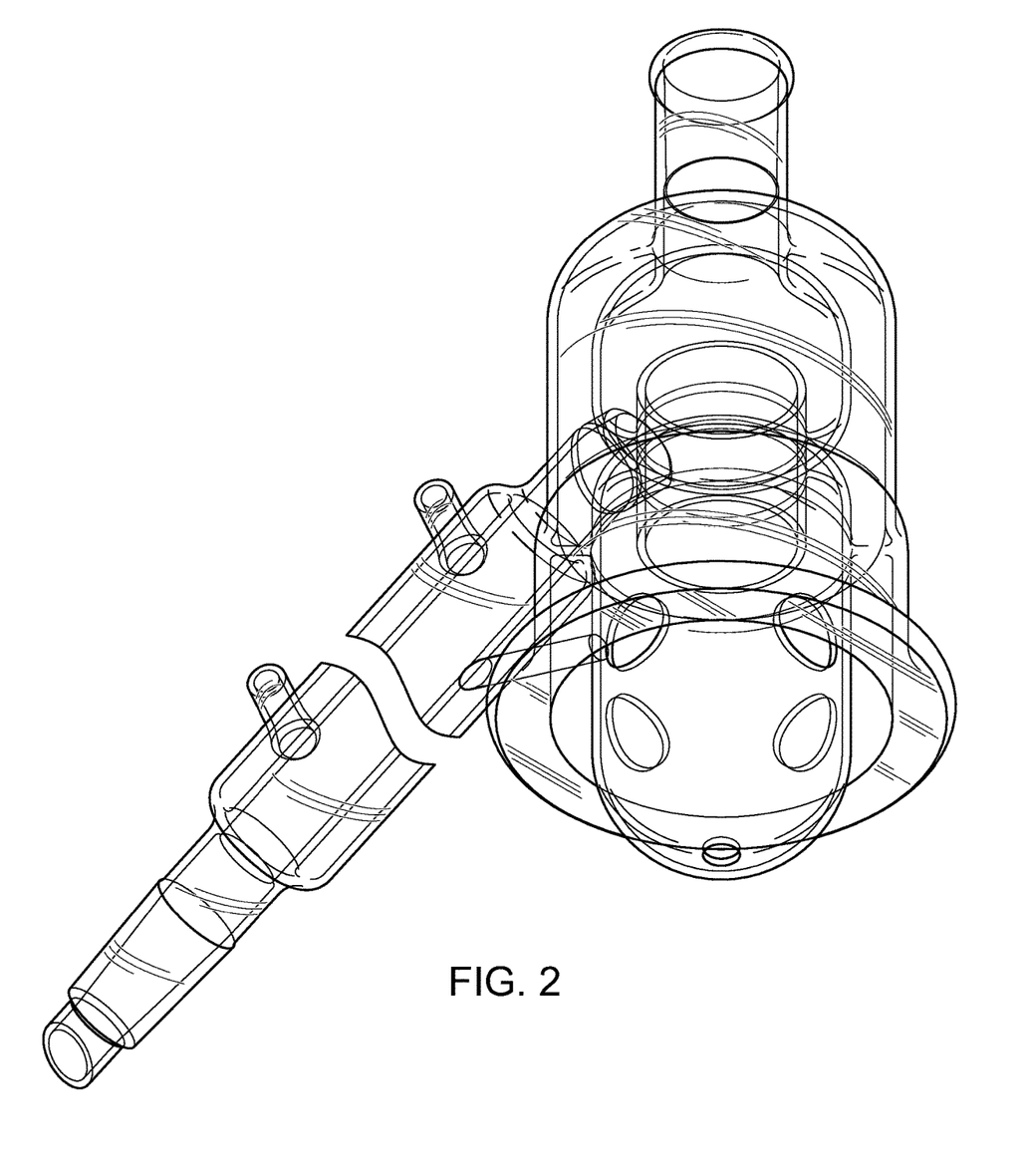
FIG. 2 shows a bottom and reverse side perspective view of the distillation apparatus of FIG. 1.
Figure 4:
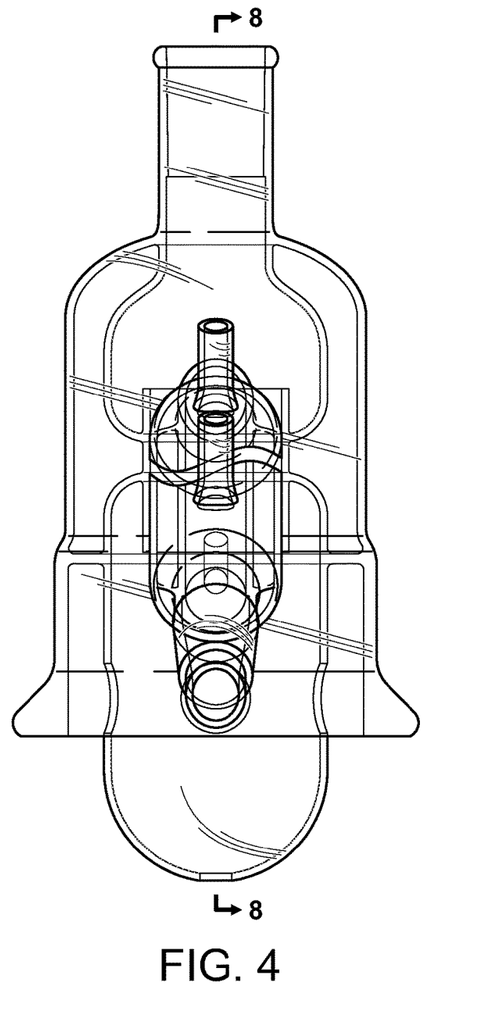
FIG. 4 shows a front elevation view of the distillation apparatus of FIG. 1.
Figure 5:
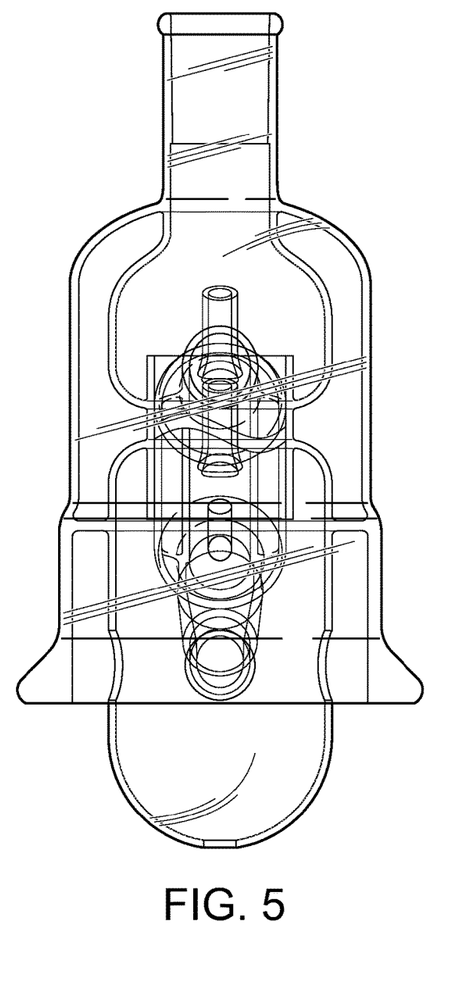
FIG. 5 shows a rear elevation view of the distillation apparatus of FIG. 1.
Figure 6:
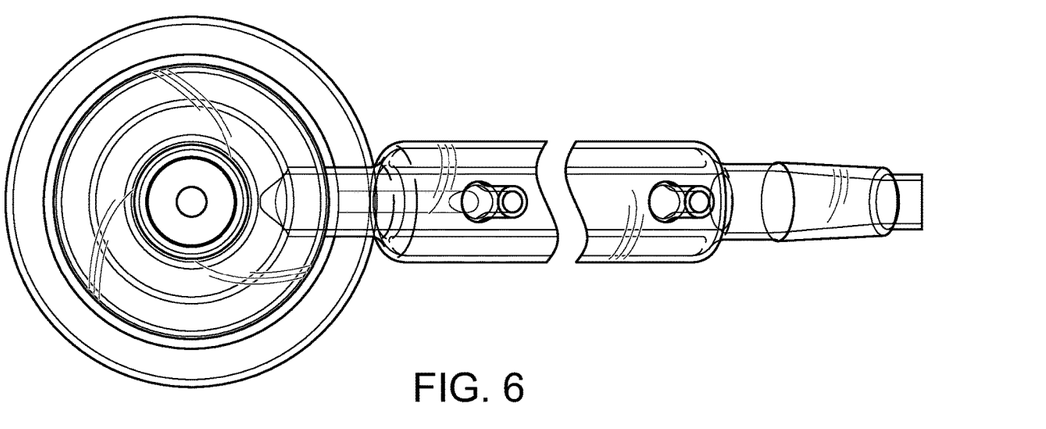
FIG. 6 shows a top plan view of the distillation apparatus of FIG. 1.
Figure 7:
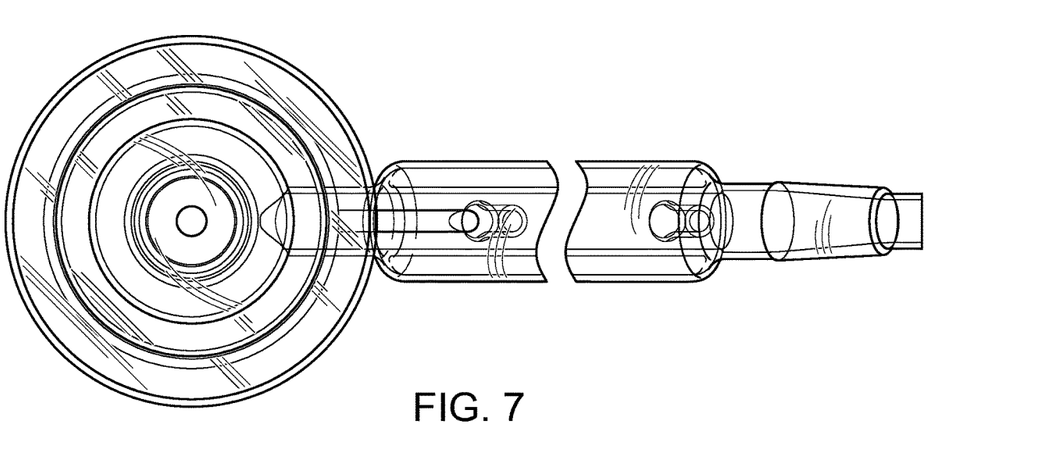
FIG. 7 shows a bottom plan view of the distillation apparatus of FIG. 1.
Figure 8:
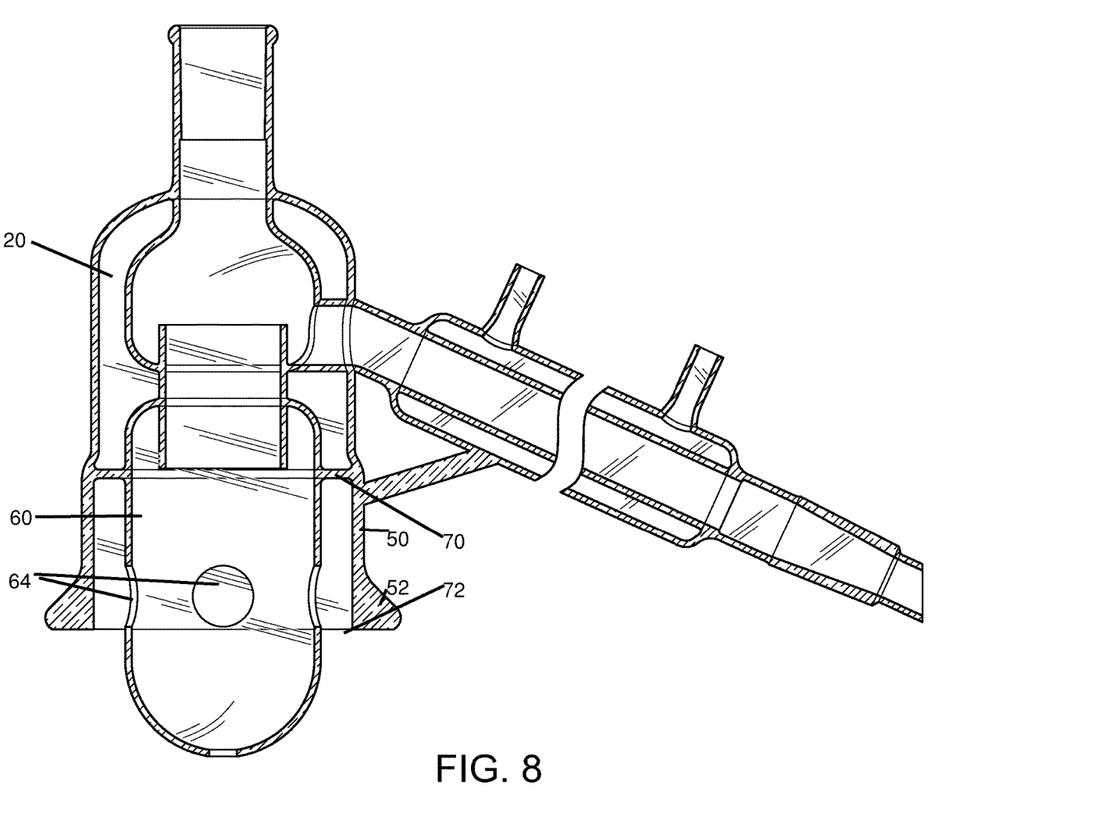
FIG. 8 shows a cutaway side elevation view along section line 8-8 of FIG. 3.

Discussing all the figures simultaneously, FIG. 1 shows a top and side perspective view of a distillation apparatus of an embodiment of the disclosed technology. FIG. 2 shows a bottom and reverse side perspective view of the distillation apparatus of FIG. 1. FIG. 3 shows a side elevation view of the distillation apparatus of FIG. 1. FIG. 4 shows a front elevation view of the distillation apparatus of FIG. 1. FIG. 5 shows a rear elevation view of the distillation apparatus of FIG. 1. FIG. 6 shows a top plan view of the distillation apparatus of FIG. 1. FIG. 7 shows a bottom plan view of the distillation apparatus of FIG. 1. FIG. 8 shows a cutaway side elevation view along section line 8-8 of FIG. 3.

From roughly top to bottom, at the top, in some embodiments, is a top portal 10 which functionally connects/opens into a neck 12 where one can insert a thermometer, stopper, distillation key, or the like to close the portal 10. In other embodiments, the fraction collector 22 can be closed at a top side. Here, the fraction collector 22 has a top portal 14 which is a width of the neck 12 through which vapors/gasses can escape upwards.

The fraction collector 22 is bulbous in shape in embodiments of the disclosed technology and can have flat, rounded, or a combination thereof types of side walls. A bottom side 24 of the fraction collector 22 can be flat/horizontal and have an opening there-in through which a tube 42 passes through, the tube extending vertically in some embodiments of the disclosed technology and having openings at each of a top edge 40 and bottom edge 44. The top edge 40 and opening into the fraction collector 22 is within a space circumscribed by (surrounded by or substantially surrounded by) the fraction collector. In this manner, vapors which extend above the vertical tube must condense before dropping to the bottom side 24 of the fraction collector which is in line with a side exit portal 30 which passes between the fraction collector 22 and condenser entry area 32 before entering a main body of the condenser 34 where the liquids are further cooled, such as by way of a cold water flow around the path of the liquid passing through the condenser.

A bulbous or spheroid lower collector region 60 is functionally connected (opens into) the (vertical) tube 42 by way off the lower portal 44 of the tube. The tube 42 extends below and into an interior circumscribed (substantially surrounded by) the lower collector region 60 such as at side walls 68 of the lower collector region. By way of this passage of the tube 42 into the lower collector region 60, a rejection area is created between the tube 42, top side of the lower collector region 60, and side wall of the lower collector region 60 (e.g. at each horizontal plane which crosses between the tube and lower collector region beneath of the upper wall of the lower collector region). Vapors then experience turbulent flow or condensation causing movement downwards until passing upwards through the lower portal 44 of the tube 42.

Describing the lower collector region 60 in more detail, in some embodiments this region has a flat upper side at, or substantially at, a height which is through a halfway point of the vertical tube 42. The flat (horizontal) upper side has rounded corners which curve into vertical side walls which then extend vertically until reaching a spheroid lower end with a semi-spherical bottom in some embodiments of the disclosed technology. An upper row of portals 62, a lower row of portals 64, and a bottom portal 66 are found in embodiments of the disclosed technology. The portals are an entry point into the lower collection region 60 for vapors rising up from a flask or item being heated below the distillation apparatus shown (e.g. in FIG. 2). The upper row of portals 62 can be angled upwards and the lower row of portals 64 can be angled downwards. The portals 62 and 64 can be one, two, four, or more portals per row and can each be a same size and each or some have circular openings. The bottom portal 66 can also be circular and can be smaller in diameter/circumference than the portals 62 and 64. As such, vapors which extend directly in a vertical direction which are centered can enter straight into the lower collector region 60 whereas other vapors extend around the lower collector region 60 and pass indirectly (must change directions during movement) into the side portals 62 or 64 or one of such side portals.

Vapors which continue past the side portals become rejected between the outer cover 20 and lower collector region 60, more specifically, at a horizontal seal 70. Thus, vapors move upwards around the lower collector region 60 into the outer cover 20 at the bottom entry portal 72 and upwards in the space between the outer cover 20 and lower collector region 60 until either hitting the horizontal seal 70 or entering into a side portal 64 or 62 of the lower collector region 60. Vapors which enter into the lower collector region 60 by way of a portal 62, 64, or 66, can continue to move upwards through the tube 42 if not rejected by extending past a lowest point 55 of the tube without entering-therein. Vapors which do enter the tube 42 continue upwards into the fraction collector 22 before condensing and falling to the bottom of the fraction collector 22. Continued upward moving vapors form the vertical tube which are often warmer than the condensing vapors prevent condensed liquid, or a majority or substantially all thereof, in embodiments of the disclosed technology, from falling down through the vertical tube 42. Rather, the vapors condense into liquid at the bottom 24 of the fraction collector 22, outside
of the tube 42 and then flow out the side portal 30 which shares a lowest side or floor with the fraction collector, passing then into the condenser 34.

Discussing now the outer cover 20, this cover surrounds the fraction collector, such as in an unencumbered manner, at every horizontal cross section in embodiments of the disclosed technology but for where the side portal 30 extends there-through. The outer cover further surrounds the tube 40, a part of the tube 40 being unencumbered by other elements (fraction collector, lower collection region) in some embodiments of the disclosed technology. The outer cover further surrounds part or a majority of (more than 50%) the lower collector region 60. Side walls 50 form a right angle or substantially a right angle or rounded corner with a horizontal seal 70 in a unitary connection in embodiments of the disclosed technology. At bottom ends of the side walls 50, the side walls can have a wider region 52 which is adapted to cover and substantially or fully create a seal or airtight seal or connection with an upper end of a flask or boiling flask. As such, vapors extending out of a flask situated below the distillation device shown (e.g. in FIG. 3) move substantially or fully upwards into the distillation apparatus by way of passage into the outer cover (between walls 50) and/or into the lower collector region 60.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

I claim:
1. A distillation apparatus comprising:
   a lower collector region having a spheroid lower end including a bottom portal, wherein said bottom portal of the device is relative to a lower end of said distillation apparatus;
   a tube extending into an interior space of said lower collector region and an interior space of a fraction collector,
   wherein said bottom portal has a diameter less than a greatest diameter of said lower collector region.
2. The distillation apparatus of claim 1, wherein said lower collector region has a flat upper side.
3. The distillation apparatus of claim 2, wherein said lower collector region has a rejection area defined by said flat upper side, a part of a vertically extending side wall, and said tube.
4. The distillation apparatus of claim 1, wherein said tube has vertical side walls and a horizontal portal at each of a top and bottom end thereof.
5. The distillation apparatus of claim 1, wherein a largest circumference of said lower collector region and said fraction collector are equal.
6. The distillation apparatus of claim 5, wherein said tube extends through an area between said lower collector region and said fraction collector and is surrounded, in said area, by a single-layer outer cover.
7. The distillation apparatus of claim 6, wherein said outer cover surrounds said fraction collector and a part of said lower collector region.
8. The distillation apparatus of claim 7, wherein a part of said lower collector region is unencumbered by said outer cover.
9. The distillation apparatus of claim 6, wherein:
   a portal extends through said outer cover and functionally connects said fraction collector to a condenser.
10. The distillation apparatus of claim 1, wherein said lower collector region comprises a plurality of side entry portals, which include at least two portals which open at an upwards angle.
11. The distillation apparatus of claim 10, wherein said plurality of side entry portals include at least two portals which open at a downwards angle.
12. A distillation apparatus comprising:
    an outer cover surrounding an equal width fraction collector and at least part of a lower collector region;
    a condenser functionally connected to said fraction collector by way of a portal which passes through said outer cover;
    wherein said lower collector region has a rounded lower side unsurrounded by said outer cover, said rounded lower side having a bottom circular portal at a bottom apex thereof, said bottom circular portal having a smaller diameter than a greatest diameter of said rounded lower side.
13. The distillation apparatus of claim 12, wherein said lower collector region has solid smooth sides but for circular portals of entry.
14. The distillation apparatus of claim 13, wherein one of said circular portals of entry is at a top side and opens into a tube functionally connected between said fraction collector and said lower collector region.
15. The distillation apparatus of claim 14, wherein said tube extends into a space defined by said fraction collector and into a space defined by said lower collector region.
16. A distillation apparatus comprising:
    a lower collector region with a spheroid lower end, said lower collector region having smooth cylindrical side walls and said lower end including a bottom wall having a bottom portal therein;

a tube extending into an interior space of said lower collector region and an interior space of a fraction collector.

17. The distillation apparatus of claim 16, wherein said tube is of a smaller length than either the fraction collector or the lower collector region and has a fixed circumference defined by vertical side walls, and a horizontal portal at each of a top and bottom end thereof.

18. The distillation apparatus of claim 16, wherein said lower collector region comprises a plurality of side entry portals.

19. The distillation apparatus of claim 16, wherein said bottom portal has a diameter less than that of said cylindrical side walls.

* * * * *